United States Patent
Rahangdale et al.

(10) Patent No.: US 12,271,577 B2
(45) Date of Patent: Apr. 8, 2025

(54) SYSTEM AND METHOD FOR GENERATING DYNAMIC SELF-REFERENTIAL CHECKLIST

(71) Applicant: Rakuten Symphony, Inc., Tokyo (JP)

(72) Inventors: Vinesh Rahangdale, Indore (IN); Dilawar sher Khan, Indore (IN); Shahid Khan, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/802,571

(22) PCT Filed: Apr. 26, 2022

(86) PCT No.: PCT/US2022/026285
§ 371 (c)(1),
(2) Date: Aug. 26, 2022

(87) PCT Pub. No.: WO2023/211422
PCT Pub. Date: Nov. 2, 2023

(65) Prior Publication Data
US 2024/0192836 A1   Jun. 13, 2024

(51) Int. Cl.
*G06F 3/0484* (2022.01)
*G06F 40/166* (2020.01)

(52) U.S. Cl.
CPC .......... *G06F 3/0484* (2013.01); *G06F 40/166* (2020.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 8,736,464 | B1* | 5/2014 | Downs Mullen | G01C 23/00 705/305 |
| 11,429,516 | B1* | 8/2022 | Levi | G06F 11/3604 |
| 2004/0254959 | A1* | 12/2004 | Dierksen | G06Q 40/08 |
| 2015/0033128 | A1* | 1/2015 | Curd | G16H 40/40 715/728 |
| 2015/0036928 | A1* | 2/2015 | Sheth | G06F 3/01 382/187 |

(Continued)

OTHER PUBLICATIONS

International Search Report dated Aug. 30, 2022, issued in International Application No. PCT/US22/26285.

(Continued)

*Primary Examiner* — Daniel Rodriguez
(74) *Attorney, Agent, or Firm* — Sughrue Mion, PLLC

(57) ABSTRACT

A system and method of generating a dynamic self-referential checklist includes: based on a first user input, controlling to output a graphical user interface (GUI) for generating the checklist; receiving a second user input, for creating a section of at least one group including at least one variable field; receiving a third user input, for creating the at least one group in the section; receiving a fourth user input, for creating the at least one variable field; receiving a fifth user input, for creating an additional variable field; receiving a sixth user input, for defining a precondition in relation to a variable field of the at least one variable field; receiving a seventh user input, for selecting that the checklist will not display the additional variable field unless the precondition is satisfied by, and generating the checklist.

20 Claims, 10 Drawing Sheets

(56) References Cited

U.S. PATENT DOCUMENTS

| | | | | |
|---|---|---|---|---|
| 2015/0254406 | A1* | 9/2015 | Rajasenan | G16H 40/20 |
| | | | | 705/2 |
| 2015/0288682 | A1* | 10/2015 | Bisroev | G16H 40/20 |
| | | | | 713/172 |
| 2016/0292925 | A1* | 10/2016 | Montgomerie | G06F 3/1462 |
| 2017/0017903 | A1* | 1/2017 | Gray | G06T 11/60 |
| 2017/0109179 | A1* | 4/2017 | Hughes | G06F 8/70 |
| 2017/0199926 | A1* | 7/2017 | Driscoll | G06Q 10/10 |
| 2018/0146330 | A1* | 5/2018 | Gibson | G06Q 10/06 |
| 2018/0358121 | A1* | 12/2018 | Carolus | G06Q 10/06 |
| 2019/0026000 | A1* | 1/2019 | Lipman | G06F 3/0486 |
| 2019/0287188 | A1* | 9/2019 | Colafrancheschi | G06Q 50/02 |
| 2020/0122855 | A1* | 4/2020 | Conaway | B64D 43/00 |

OTHER PUBLICATIONS

Written Opinion dated Aug. 30, 2022, issued in International Application No. PCT/US22/26285.

\* cited by examiner

SYSTEM AND METHOD FOR GENERATING DYNAMIC SELF-REFERENTIAL CHECKLIST

CROSS REFERENCE TO RELATED APPLICATIONS

This application is a National Stage of International Application No. PCT/US2022/026285 filed Apr. 26, 2022.

TECHNICAL FIELD

The present disclosure relates to methods and systems for generation of a dynamic self-referential checklist.

BACKGROUND

Checklists may be used in a variety of applications. For example, in a business environment, checklists may be used to manage business related tasks, work flow related tasks, inventory, customer data, and related items.

Typically, a generalized checklist may be used to facilitate a variety of more specific or complicated tasks. This may result in a user, utilizing the checklist, to input, review, or otherwise complete unnecessary items in a checklist. This may result in time, production, and financial inefficiencies. Further, from a computing perspective, the checklist may make processing inefficient, and take up unnecessary storage.

By way of an example, a related art checklist may include multiple groups of variable fields, each variable field being a variable checklist item to be analyzed and completed by a user. Further, groups of topics may be organized into one or more sections. However, in a related art checklist, a user must analyze and complete each variable field in order to complete the checklist. Thus, if a generalized checklist is used for a specific task, a user must analyze and complete variable fields that are not relevant to the specific task. As explained above, this may result in time, production, and financial inefficiencies. That is, in the related art example, the related art checklist does not have any defined (e.g., adjustable or configurable) relationship between variable fields and groups (or sections). In other words, in a related art checklist, the variable fields and groups (as well as sections if applicable) are static and cannot be operated in relational manner, thus requiring a user to fill in unnecessary information even if it is not relevant to the task at issue.

In the related art, there have been two proposals to solve this problem. First, a more narrowly tailored checklist could be created for each specific task (or for each specific user). Second, a user could only use a portion of a more generalized checklist and leave the remaining checklist incomplete. Both of these proposals are problematic.

With respect to the first proposal (creating a more narrowed checklist), this proposal is time-consuming, burdensome, and inconvenient, as a large number of checklists would have to be created and narrowly tailed for each respective task or user.

With respect to the second proposal (only using a portion of a generalized checklist), this proposal may be confusing to a user completing the checklist, and it may also result in computational errors when gleaning data from the checklist. Specifically, a user may not know which groups, variables (or sections) to complete, and may inadvertently not complete a required portion. Likewise, this may also result in errors when another user or computer analyzes the checklist.

In other words, like the first proposal, this proposal is time-consuming, burdensome, and inconvenient.

Ultimately, there has been no way to generate a dynamic self-referential checklist where there is a configurable relationship between variable fields and groups (and sections). That is, there has been no known way to configure a checklist as per task, business, or user specific requirements, while avoiding a user thereof of having to input unnecessary information. Likewise, there has been no known way to create such a dynamic self-referential checklist through a user-friendly and computational resource-friendly graphical user interface (GUI). Simply, there has been no known way to generate a checklist where unnecessary information could be easily shown or hidden.

SUMMARY

According to embodiments, systems and methods are provided that allow for a first user to generate/create a dynamic, self-referential checklist for another (second) user.

According to embodiments, systems and methods are provided to output a graphical user interface (GUI) to a first user (e.g., an entity creator, owner, or manager) to allow the user to generate/create a dynamic, self-referential checklist for one or more additional (second) other users (e.g., a single user or a predefined group of users).

According to embodiments, a method of generating a dynamic self-referential checklist for a user in a checklist presentation system includes: based on a first user input from a first user to generate a dynamic self-referential checklist in the checklist presentation system, controlling to output a graphical user interface (GUI) for generating the dynamic self-referential checklist; receiving a second user input, from the first user through the GUI, for creating a section of at least one group including at least one variable field which is to be completed by a second user; receiving a third user input, from the first user through the GUI, for creating the at least one group in the section; receiving a fourth user input, from the first user through the GUI, for creating the at least one variable field in the at least one group, in the at least one section; receiving a fifth user input, from the first user through the GUI, for creating an additional variable field; receiving a sixth user input, from the first user through the GUI, for defining a precondition in relation to a variable field of the at least one variable field; receiving a seventh user input, from the first user through the GUI, for selecting that the dynamic self-referential checklist will not display the additional variable field unless the precondition is satisfied by the second user when completing the dynamic self-referential checklist, and generating the dynamic self-referential checklist for presentation to the second user, such that the additional variable field is not visible to the second user unless the precondition is satisfied by the second user when completing the dynamic self-referential checklist.

The method may further include, upon reception of the fifth user input from the user through the GUI, initially configuring the additional variable filed to be hidden from view by the second user when completing the dynamic self-referential checklist.

The fifth user input, from the user through the GUI may be for creating the additional variable field within a different group than the at least one group.

The fifth user input, from the user through the GUI may be for creating the additional variable field within a different section than the at least one section.

The method may further include, upon reception of the fourth user input from the user through the GUI, initially configuring the at least one variable field to be mandatory for the second user when completing the dynamic self-referential checklist.

The at least one variable field may be configured to be completed with information including at least one of image data, audio data, video data, and file data.

The fifth user input, from the user through the GUI may be for creating the additional variable field within the at least one group.

According to embodiments, a dynamic self-referential checklist generation system may comprise: a memory storing instructions; and at least one processor configured to execute the instructions to: based on a first user input from a first user to generate a dynamic self-referential checklist in the checklist presentation system, control to output a graphical user interface (GUI) for generating the dynamic self-referential checklist; receive a second user input, from the first user through the GUI, for creating a section of at least one group including at least one variable field which is to be completed by a second user; receive a third user input, from the first user through the GUI, for creating the at least one group in the section; receive a fourth user input, from the first user through the GUI, for creating the at least one variable field in the at least one group, in the at least one section; receive a fifth user input, from the first user through the GUI, for creating an additional variable field; receive a sixth user input, from the first user through the GUI, for defining a precondition in relation to a variable field of the at least one variable field; receive a seventh user input, from the first user through the GUI, for selecting that the dynamic self-referential checklist will not display the additional variable field unless the precondition is satisfied by the second user when completing the dynamic self-referential checklist; and generate the dynamic self-referential checklist for presentation to the second user, such that the additional variable field is not visible to the second user unless the precondition is satisfied by the second user when completing the dynamic self-referential checklist.

The at least one processor may be further configured to execute the instructions to: upon receiving the fifth user input from the user through the GUI, initially set the additional variable filed to be hidden from view by the second user when completing the dynamic self-referential checklist.

The fifth user input, from the user through the GUI may be for creating the additional variable field within a different group than the at least one group.

The fifth user input, from the user through the GUI may be for creating the additional variable field within a different section than the at least one section.

The at least one processor may be further configured to execute the instructions to: upon receiving the fourth user input from the user through the GUI, initially set the at least one variable field to be mandatory for the second user when completing the dynamic self-referential checklist.

The at least one variable field may be set and configured to be completed with information including at least one of image data, audio data, video data, and file data.

The fifth user input, from the user through the GUI may be for creating the additional variable field within the at least one group.

According to embodiments, a non-transitory computer-readable recording medium has recorded thereon instructions executable by at least one processor to perform a method of generating a dynamic self-referential checklist for a user in a checklist presentation system, the method comprising: based on a first user input from a first user to generate a dynamic self-referential checklist in the checklist presentation system, controlling to output a graphical user interface (GUI) for generating the dynamic self-referential checklist; receiving a second user input, from the first user through the GUI, for creating a section of at least one group including at least one variable field which is to be completed by a second user; receiving a third user input, from the first user through the GUI, for creating the at least one group in the section; receiving a fourth user input, from the first user through the GUI, for creating the at least one variable field in the at least one group, in the at least one section; receiving a fifth user input, from the first user through the GUI, for creating an additional variable field; receiving a sixth user input, from the first user through the GUI, for defining a precondition in relation to a variable field of the at least one variable field; receiving a seventh user input, from the first user through the GUI, for selecting that the dynamic self-referential checklist will not display the additional variable field unless the precondition is satisfied by the second user when completing the dynamic self-referential checklist; and generating the dynamic self-referential checklist for presentation to the second user, such that the additional variable field is not visible to the second user unless the precondition is satisfied by the second user when completing the dynamic self-referential checklist.

Upon reception of the fifth user input from the user through the GUI, the additional variable filed may be initially configured to be hidden from view by the second user when completing the dynamic self-referential checklist.

The fifth user input, from the user through the GUI may be for creating the additional variable field within a different group than the at least one group.

The fifth user input, from the user through the GUI may be for creating the additional variable field within a different section than the at least one section.

Upon reception of the fourth user input from the user through the GUI, the at least one variable field may be initially configured to be mandatory for the second user when completing the dynamic self-referential checklist.

The at least one variable field may be configured to be completed with information including at least one of image data, audio data, video data, and file data.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
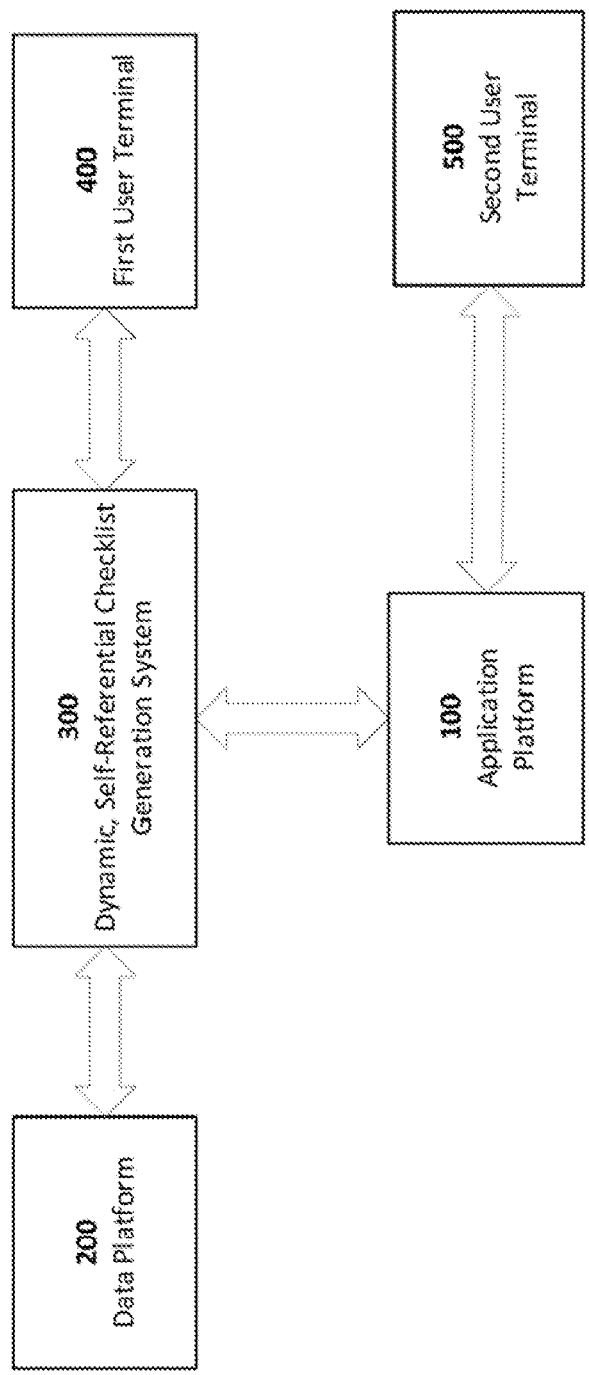
FIG. 1 is a diagram of a system architecture according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a dynamic self-referential checklist generation system, wherein a user (e.g. first user) can generate, through e.g., a graphical user interface (GUI), a dynamic self-referential checklist which can show or hide certain variables within the checklist with respect to a second user or group of users. This eliminates the need to create multiple different and more specific checklists, which saves time, and increases processing and production efficiency.

According to one or more example embodiments, a graphical user interface (GUI) is provided to a first user, creator, owner, or manager of an entity to easily allow the first user, creator, owner, or manager of the entity to generate a dynamic, self-referential checklist, with respect to the entity or other entities. As a result, the first user, creator, owner, or manager of the entity can easily and conveniently configure a single self-referential dynamic checklist for use with many different applications, tasks, users, or groups of users.

According to one or more example embodiments, a first user (entity creator, owner, manager, etc.) can create a checklist including at least one group having at least two variable entry fields (variable fields) which are to be completed by a second user (or group of users). The first user can specify and configure specific, rules-based (e.g. Boolean, etc.) relations between at least the two variable entry fields, such that the variable entry fields are shown or hidden to the second user based on the second user's response(s) to the variable entry fields. That is, the first user can hide/show checklist variable entry fields (and/or groups or section which the variable fields are housed therein) on a case basis, e.g. on based on the second user's entries into the checklist. In contrast to related art systems, aspects of the disclosure allow for creation of a checklist based on specified second user configurations according to relationships, which hide or show variable entry fields in the form.

Again, in contrast to related art checklists (and generation systems thereof) there are no options to show or hide portions of the checklist (e.g. variable entry fields, groupings thereof, or sections of groupings) based on to-be-completed responses to the variable entry fields by a second user. Aspects of the disclosure provide a system for generating/creating a dynamic, self-referential checklist, including variable entry fields, groupings thereof (and optional sections of the groupings), wherein a second user may input, into the variable entry fields, data types at least comprising information corresponding to a barcode scanner, QR Code, check boxes, dates, dropdowns, files, images, video, and audio, However, the data is not limited thereto. The first user can add variable entry fields to the checklist and define self-referential relationships thereto (along with (or as opposed to) optional, e.g. self-referential, relationships to the group(s) and section(s). The first user can define different relationships for different second users, tasks, applications, or utilities, etc. That is, the first user can apply different visibility conditions for different option values of variable entry fields. Aspects of the disclosure allow for a user-friendly user-interface (UI) for each of configuration and execution. According to embodiments, the system does not require technical expertise, and the system may reduce costs, since no additional development is requirement. Likewise, aspects provide for the elimination of a deployment process, and can minimize second (e.g. end) user waiting time, and can increase efficiency—both on the computational and human level.

FIG. 1 is a diagram of a system architecture according to one or more embodiments. Referring to FIG. 1, the system includes an application platform 100, a data platform 200, a dynamic self-referential checklist generation system 300 (e.g., a centralized system), a first user terminal 400, and a second user terminal 500.

The application platform 100 is a platform that hosts and/or deploys one or more applications. The application platform 100 may be a cloud platform including one or more servers in which the one or more applications are deployed. For example, the application platform 100 may be a cloud platform for a particular business or enterprise in which applications are deployed for use by employees and/or customers of the business (e.g., applications for day-to-day operations of the business, processing or inputting sales information, communicating with customers, troubleshooting, etc.). The applications in the application platform 100 are configured to output or expose data that may be used for analysis and/or presentation (e.g., visualization, dashboarding, etc.).

The data platform 200 is communicatively connected or coupled to the application platform 100 and receives the data output by the one or more applications. The data platform 200 is a storage repository (e.g., one or more servers, data lake, data warehouse, etc.) that stores the data received from the application platform 100. By way of example, the data platform 200 may be a data lake that receives and stores data output from the application platform 100 in its native form. Further, the data platform 200 may store datasets corresponding to the applications in the application platform 100.

The dynamic self-referential checklist generation system 300 is communicatively connected or coupled to the data platform 200, and is configured to create, edit, and output entities (e.g., dynamic, self-referential checklists) based on, e.g., the data stored in the data platform 200. The dynamic self-referential checklist generation system 300 may also be communicatively connected or coupled to the application platform 100, and configured to output entities to one or more applications in the application platform 100. In some embodiments, the dynamic self-referential checklist generation system dynamic self-referential checklist generation system includes one or more computing devices (e.g., servers) having memory for storing executable instructions and at least one processor for executing those instructions to perform the functions (described in further detail below) of the dynamic self-referential checklist generation system 300.

The user terminal 400 is a user device through which a user accesses the dynamic, self-reverential checklist generation system 300 directly, or indirectly via an application, namely, an application in the application platform 100. Through the user terminal 400, an end user may generate, configure, delete, share, download, edit, and/or view an entity (e.g. dynamic self-referential checklist), as will be set forth in further detail below.

The user terminal 500 is a user device through which a user accesses the application platform 100, either directly or indirectly to complete, provide information to, request information related to, edit, modify, share, configure, etc., the entity, (e.g., the dynamic self-referential checklist).

Figure 2:
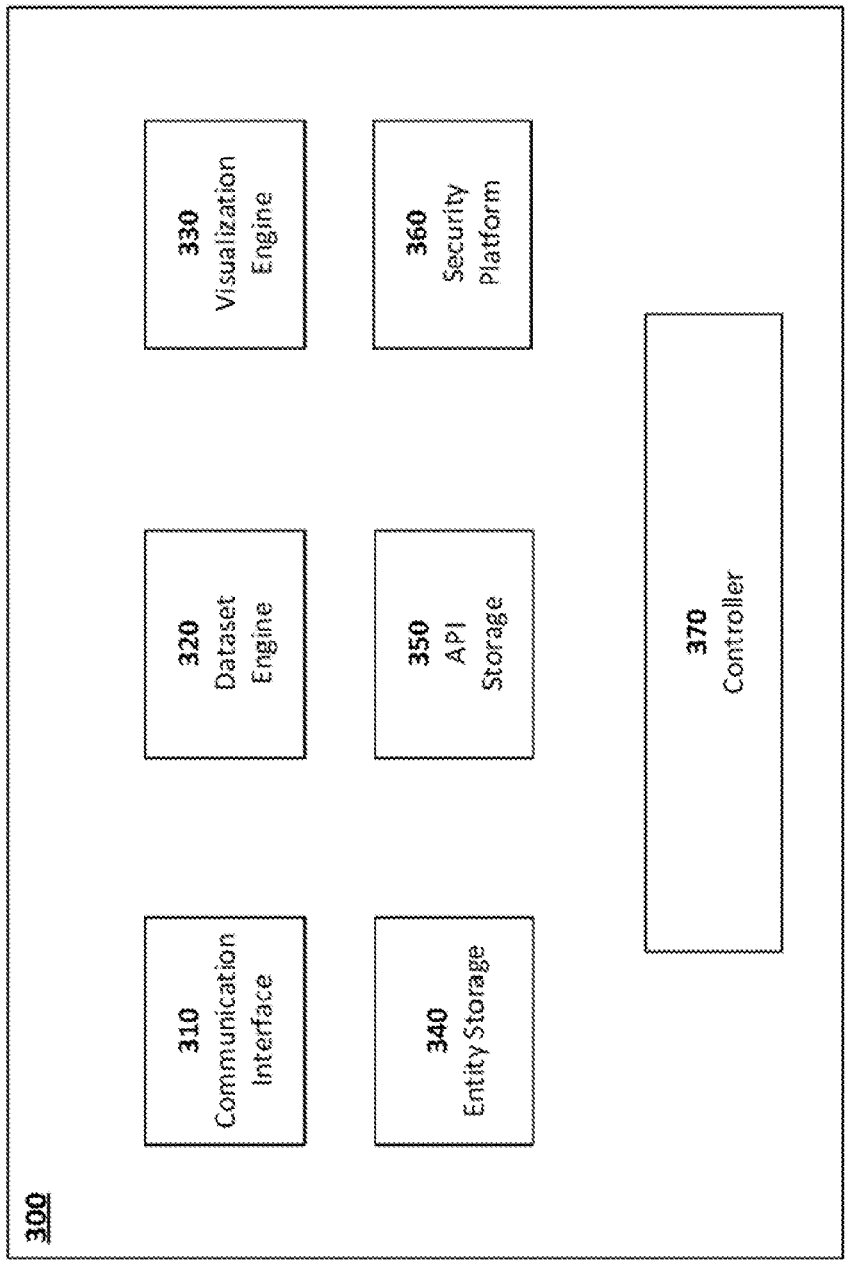
FIG. 2 is a block diagram of a dynamic, self-referential checklist generation system according to an embodiment.

FIG. 2 is a block diagram of the dynamic, self-referential checklist generation system 300 according to an embodiment. Referring to FIG. 2, the dynamic, self-referential checklist generation system 300 includes a communication interface 310, a dataset engine 320, a visualization engine 330, an entity storage 340 (e.g., data storage), an API storage 350, a security platform 360, and a controller 370. In some embodiments, the entity storage 340, the API storage 350, and/or the security platform 360 are external to the dynamic, self-reverential 300.

The communication interface 310 is configured to communicatively connect or couple to the data platform 200, the application platform 100, and one or more user terminals 400 via a wired and/or wireless connection. The communication interface 310 may also connect to one or more third-party applications (not illustrated) in some embodiments. For example, the communication interface 310 may be directly connected to the data platform 200, the application platform 100, the third-party applications (not illustrated), and/or the one or more user terminals 400 via a cable (e.g., universal serial bus (USB), coaxial, etc.). By way of another example, the communication interface 310 may be connected to the data platform 200, the application platform 100, the third-party applications 500, and/or the one or more user terminals 400 via at least one network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, etc.), a public land mobile network (PLMN), a telephone network (e.g., the Public Switched Telephone Network (PSTN)), or the like, and/or a combination of these or other types of networks. The communication interface 310 may include at least one of an Ethernet interface, an optical interface, a coaxial interface, an infrared interface, a radio frequency (RF) interface, a USB interface, a Wi-Fi interface, a cellular network interface, or the like.

The dataset engine 320 is configured to receive (e.g., request or retrieve) one or more datasets from the data platform 200, via the communication interface 310, and process the data in accordance with a user request. For example, the dataset engine 320 may process the user request and perform an associated action based thereon, such as access a requested dataset from the data platform 200, standardize a form or format of the dataset, and provide the dataset to the visualization engine 330. For example, the data (or datasets) obtained from different applications may be of different formats.

According to an embodiment, the dataset engine 320 may process raw or native data provided by the applications in the application platform 100 to generate datasets or data cubes having a standardized format, and store the datasets or data cubes in the data platform 200. According to another embodiment, a distinct dataset engine (e.g., included in the application platform 100 or the data platform 200) may process native data output by the applications into a standardized format for retrieval and processing by the dataset engine 320 in accordance with a user request.

The visualization engine 330 is configured to create, modify, refresh, and/or publish an entity (e.g., data visualization, report, dashboard, dataset, etc.) in accordance with a user request. For example, the visualization engine 330 may generate or modify the fields or components of a data presentation (e.g., dashboard, report template, etc.) in accordance with a user request. Further, the visualization engine 330 may obtain, from the dataset engine 320, datasets required to populate the data presentation in response to a user request or based on a predefined (e.g., default or user set) refresh period for a previously generated data presentation.

The entity storage 340 may include any device capable of storing data, such as a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The entity storage 340 may be implemented as a plurality of storage devices. Further, the entity storage 340 may store metadata, attributes, or information regarding each entity. For example, the metadata, attributes or information may include at least one of a creator (user information) of the entity, one or more applications (or modules) that are source of a dataset presented or used by the entity, a date and/or time of creation of the entity, and a name of the entity. The metadata, attributes, or information may be stored together with the entity (e.g., within the same file) or separately from the entity.

The API storage 350 is configured to store a plurality of APIs for accessing features of the dynamic, self-referential checklist generation system 300. In one or more embodiments, the APIs contain or manage a list of features provided by the dynamic, self-referential checklist generation system 300.

The security platform 360 is configured to authenticate users accessing the dynamic, self-referential checklist generation system 300, and to manage access rights of users and/or applications to the dynamic, self-referential checklist generation system 300. The security platform 360 may store and/or manage at least one of user authentication information, application access rights, role-based user access rights or privileges, role-based group access rights or privileges, and entity-based privileges.

The controller 370 is configured to control overall operations of the dynamic, self-referential checklist generation system 300 and the components thereof. The controller 370 may include at last one processor (e.g., a central processing unit (CPU), a system-on-chip (SoC), an accelerated processing unit (APU), a microprocessor, a microcontroller, a digital signal processor (DSP), a field-programmable gate array (FPGA), an application-specific integrated circuit (ASIC), a backend processing engine, or another type of processing component). In some implementations, the controller 370 includes one or more processors capable of being programmed to perform a function. The controller 370 may also include at least one memory, such as a random-access memory (RAM), a read only memory (ROM), and/or another type of dynamic or static storage device (e.g., a flash memory, a magnetic memory, and/or an optical memory) that stores information and/or instructions for use by the at least one processor.

The controller 370 may be configured to generate a graphical user interface and/or to provide the graphical user interface to a user terminal 400 via the communication interface 310, in order to allow for access to the dynamic, self-referential checklist generation system 300 (either directly or via a third-party application or an application in the application platform 100). The graphical user interface (e.g., a webpage or markup language file) may be stored in a storage (which may be included in or external from the dynamic, self-referential checklist generation system 300). According to another embodiment, the graphical user interface may be stored in an external server. The graphical user interface may be accessed by the user terminal 400 via an application in the application platform 100, via a third-party application 500, or directly through a location identifier or address (e.g., uniform resource indicator (URI), a uniform resource locator (URL), a file path, etc.). The graphical user interface allows an end user to perform an action with the self-referential checklist generation system 300 (such as generation of a dynamic, self-referential checklist, view a dynamic, self-referential checklist, configure a dynamic, self-referential checklist, etc.) via certain functional elements presented on the graphical user interface, such as buttons, scroll bars, etc.

The graphical user interface (GUI) may allow a user, e.g., first user (or a particular type of user, such as an Administrator or the manager of an entity) to create, edit, view, or delete a dynamic, self-referential checklist. For example, in response to a user selection of an item creating a variable entry field, in a dynamic, self-referential checklist, a GUI object may be displayed. The GUI object may allow the user, e.g., first user (e.g., entity manager) to generate multiple variable entry fields and assign relationships there-between which may show or hide respective variable entry fields based on a second users selections or data input into the dynamic, self-referential checklist.

Figure 3:
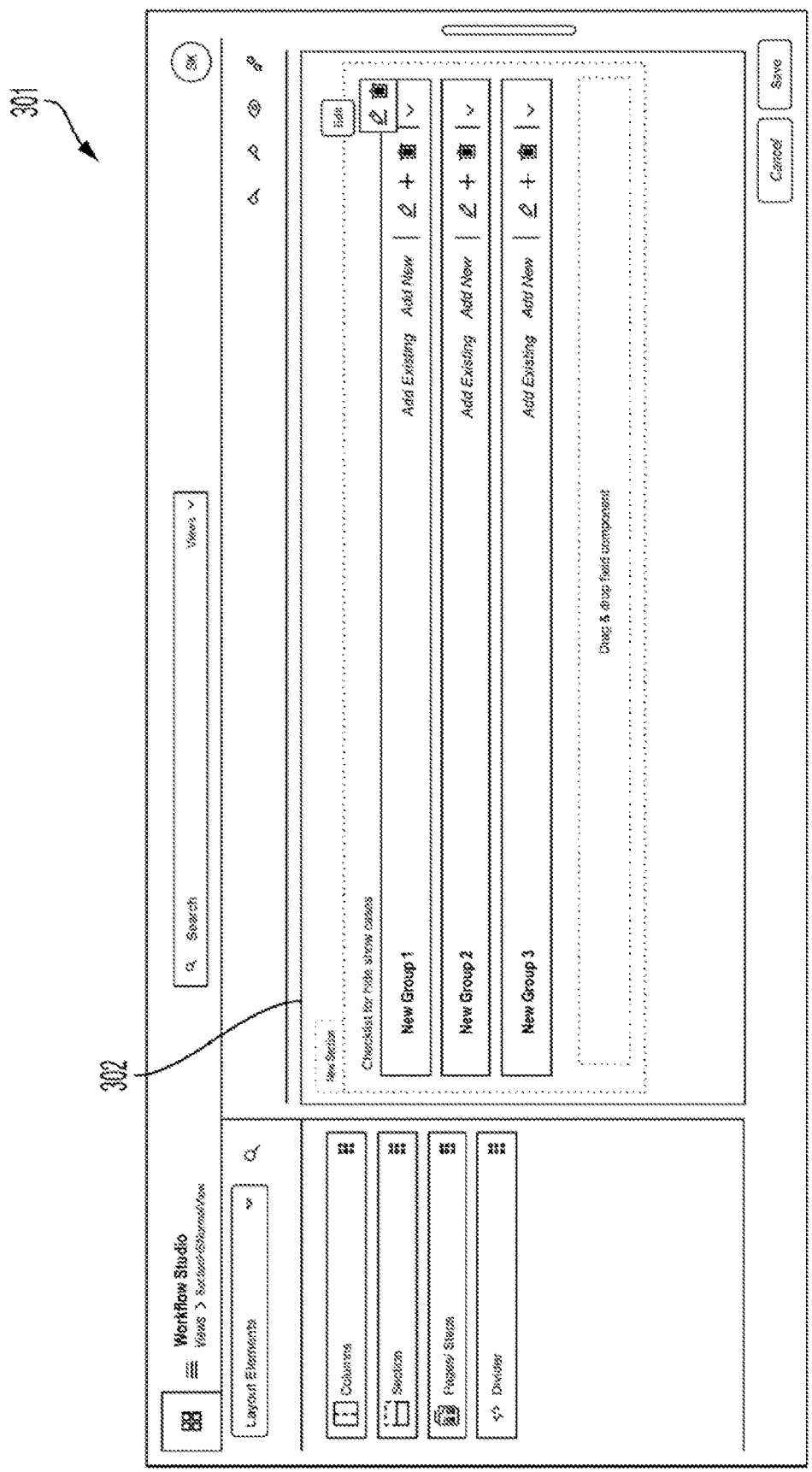
FIG. 3 is a graphical user interface for generating a dynamic, self-referential checklist according to an embodiment.

An example of a GUI object 301 is part of a program for a process of generating a dynamic, self-referential checklist. Referring to FIG. 3, the GUI object 301 includes a field 302 in which the user (first user) can input information for creating groups (e.g., New Group 1, New Group 2, New Group 3, etc.). The groups may then me edited/modified to have different variable entry fields therein, and also set to be hidden shown to a second user based on relations to each other and/or various variable entry fields or sections where the groups themselves may be housed.

According to an embodiment, the whether a group (e.g., New Group 1, New Group 2, New Group 3, etc.) is visible/hidden to a second user may be restricted or defined in accordance the respective groups relation to another group(s), section within which a group or groups may be located, or variable entry fields within one or more of the groups. Alternatively, whether a group is visible/hidden may be restricted/defined based on a class or type of second user, task, or application, ID, etc. For example, if a group is hidden, the group may be shaded, stricken through, or of a darker or lighter color than those groups which are visible. Additionally, if applicable (e.g., faulty logic in a defined relationship for a group), an error message may be displayed.

As shown in FIG. 3, the groups (e.g., New Group 1, New Group 2, New Group 3, etc.) are grouped in a Section (e.g., New Section). According to embodiments, within a given section, various groups thereof may be configured to be shown or hidden from a second user completing the dynamic, self-referential checklist based thereon, according to defined relationships between sections, groups, and variable entry fields.

For example, Section A may include Groups 1-3, and each of Groups 1-3 may include variable entry fields na-nc. Group 2 may be set to be hidden, from the perspective of a second user unless the second user completes variable entry fields 1a-1c of Group 1.

Figure 4:
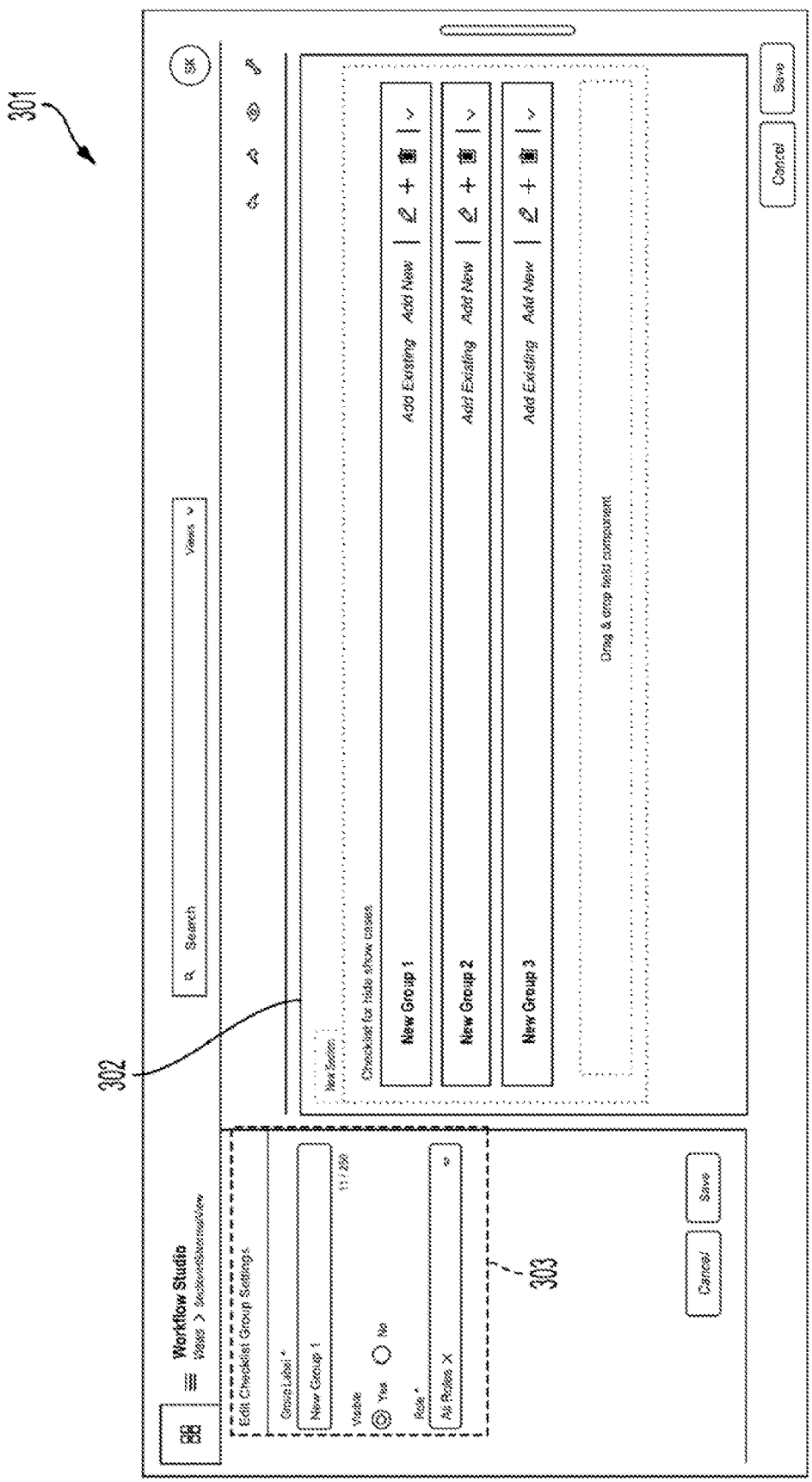
FIG. 4 is a graphical user interface for generating a dynamic, self-referential checklist according to an embodiment.

Referring to FIG. 4, each of the different groups (e.g., New Group 1, New Group 2, New Group 3, etc.) (of course, there can be more or fewer than 3 groups) can have its visibility individually set (multiple groups can have the same visibilities and they can also be set together). As shown in the example of FIG. 4, New Group 1 is set to be visible by default through the input field 303.

Figure 5:
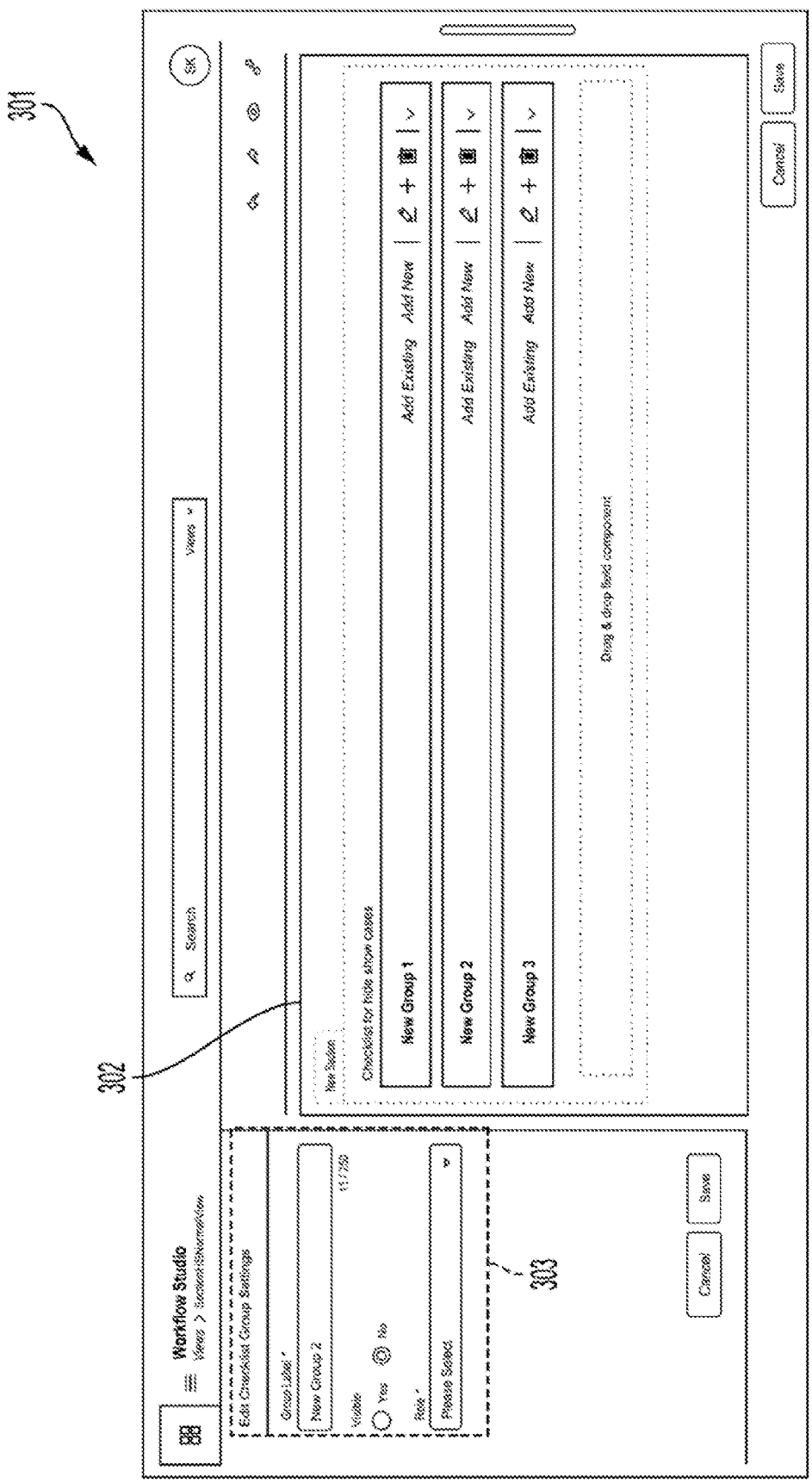
FIG. 5 is a graphical user interface for generating a dynamic, self-referential checklist according to an embodiment.
Figure 6:
FIG. 6 is a graphical user interface for generating a dynamic, self-referential checklist according to an embodiment.

As shown in the example of FIG. 5, New Group 2 is set to be hidden/invisible/not visible by default. Configuration for when New Group 2 is to become visible is shown in FIG. 6. As shown in the example of FIG. 6, the visible condition for when Group 2 is to be visible is set to "1". That is, when the second user completes a variable entry field, for example, in this case, a variable entry field in New Group 1 with an entry of "1", New Group 2, and the variable entry fields included therewith are then presented to the second user. If the second user does not complete the variable entry field in New Group 1 with the entry of "1", New Group is not visible.

As shown in FIG. 6, New Group 2 may also be companied with a remarks section which may provide additional information or instructions or the like to the second user. The mandatory field indicates whether the Group or at least variable entry fields therein are mandatory for the second user to complete. The attachment field may also a second user to submit an attachment in response to any variable entry field in the New Group 2. The repeat group field allows a group to be repeated.

Figure 7:
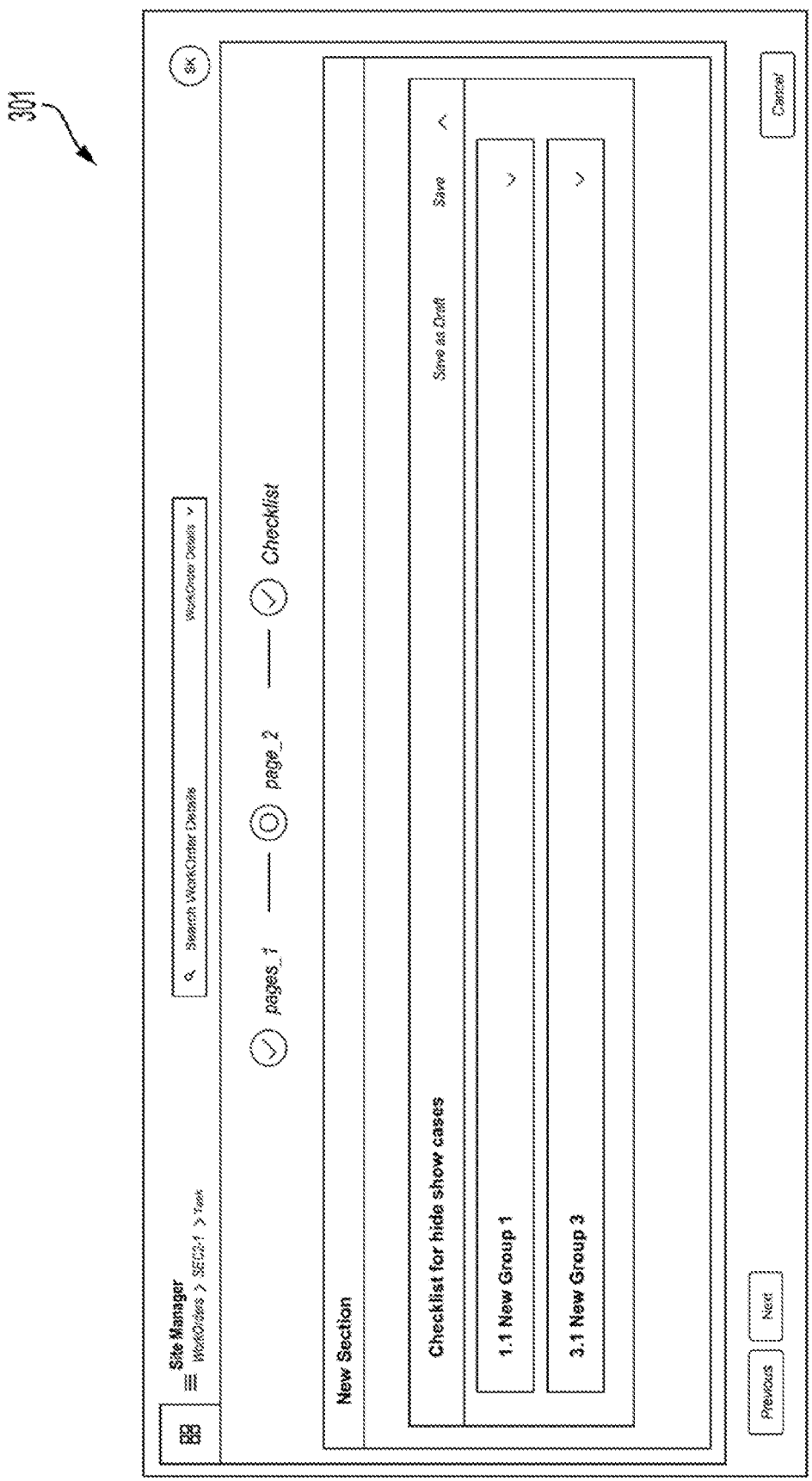
FIG. 7 is a graphical user interface for generating a dynamic, self-referential checklist according to an embodiment.
Figure 8:
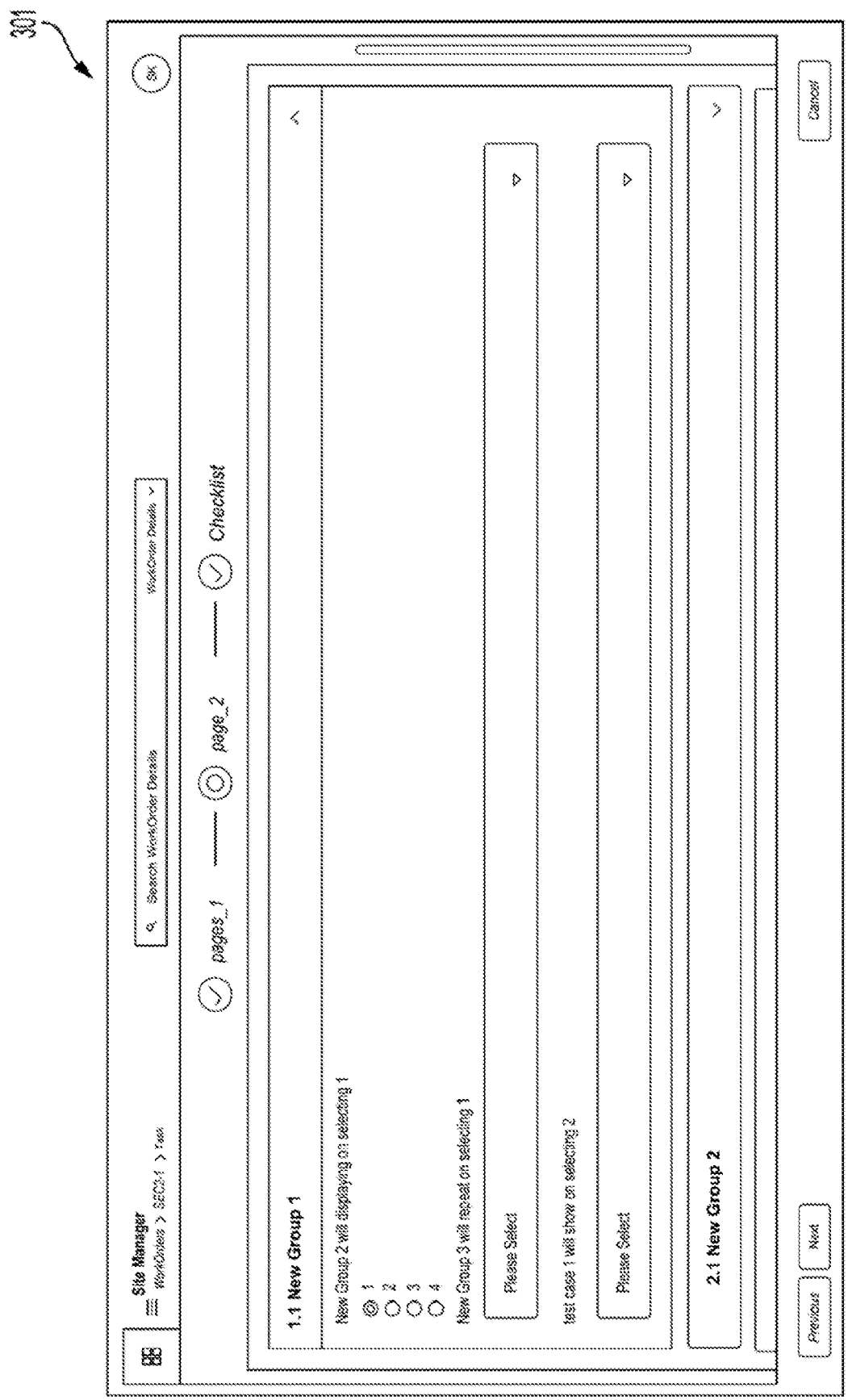
FIG. 8 is a graphical user interface for generating a dynamic, self-referential checklist according to an embodiment.

As shown in FIG. 7, New Group 1 is hidden by default to the second user. That is, until the second user completes the variable entry field in New Group 1 with an entry of "1". As shown in FIG. 8, New Group 2 becomes visible when the second user completes the variable entry field in New Group 1 with an entry of "1".

It should be known that other self-referential relationships between variable entry fields, groups thereof, and sections of groups can be used to define whether respective variable entry fields, groups thereof, and sections are shown or hidden initially when presented to a second user. The aforementioned and descried examples are in no way limiting.

Figure 9:
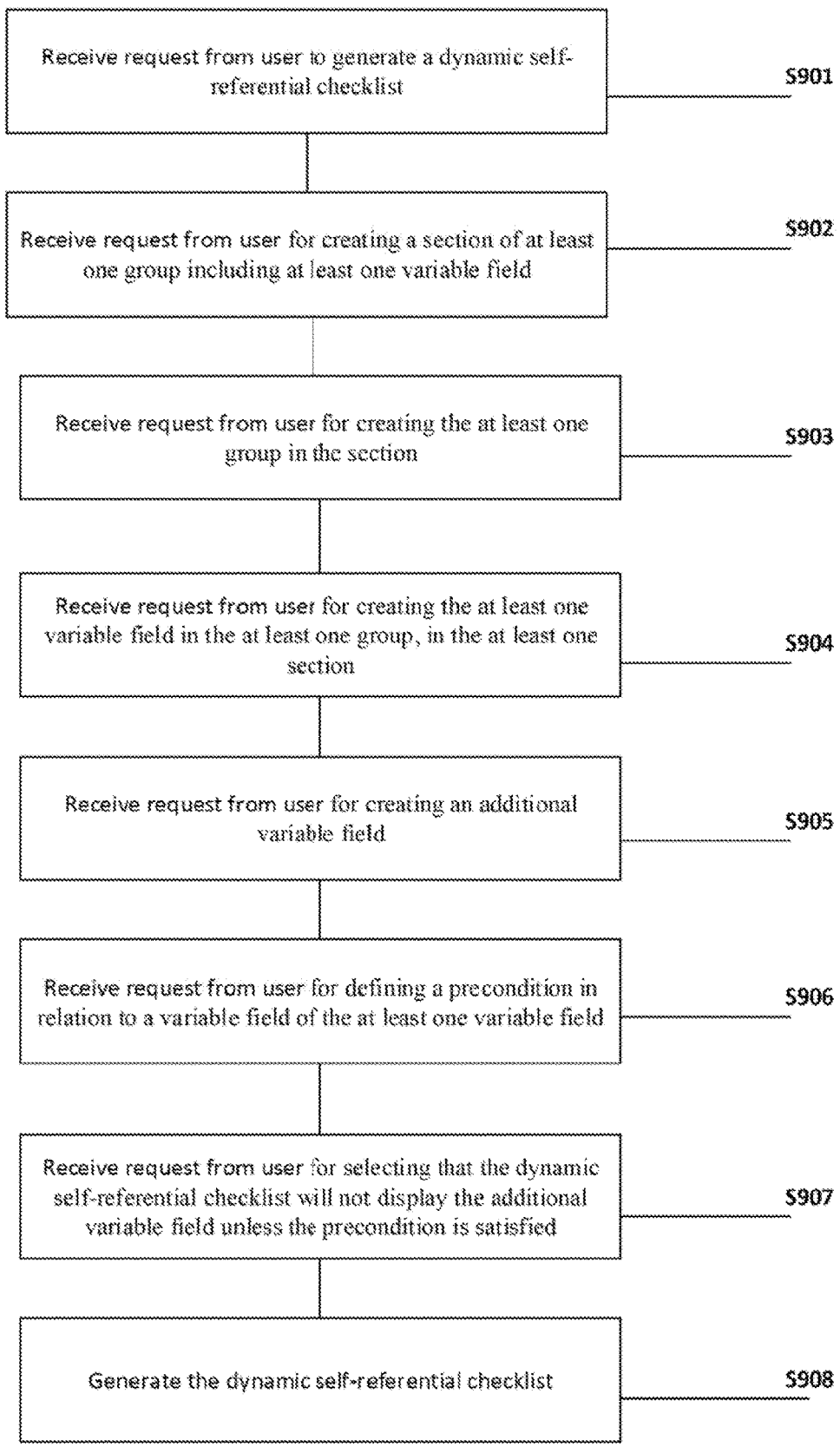
FIG. 9 is a diagram of a flowchart illustrating a method for generating a dynamic, self-referential checklist according to an embodiment.

FIG. 9 is a flowchart illustrating a method of generating a dynamic, self-referential checklist according to an embodiment. Referring to FIG. 9, in operation S901, the dynamic, self-referential checklist generation system 300 receives a first user input from a first user to generate a dynamic self-referential checklist. For example, the user may provide the input either through the GUI (directly or indirectly) or through a program which calls the GUI for execution.

In operation S902, the dynamic, self-referential checklist generation system 300 receives a second user input, from the first user through the GUI, for creating a section of at least one group including at least one variable field which is to be completed by a second user. Alternatively this step may be omitted and no sections generated.

In operation S903, the dynamic, self-referential checklist generation system 300 receives a third user input, from the first user through the GUI, for creating the at least one group in the section. Alternatively, the group may be created without a section, and/or no group created at all.

In operation S904, the dynamic, self-referential checklist generation system 300 receives a fourth user input, from the first user through the GUI, for creating the at least one variable field in the at least one group, in the at least one section. Alternatively the at least one variable field may be created in a different group and/or in a different section.

In operation S905, the dynamic, self-referential checklist generation system 300 receives a fifth user input, from the first user through the GUI, for creating an additional variable field. The additional variable field may be located in the same group or section, or in a different group or section than the at least one variable field. Alternatively, the additional variable field need not be created.

In operation S906, the dynamic, self-referential checklist generation system 300 receives a sixth user input, from the first user through the GUI, for defining a precondition in relation to a variable field of the at least one variable field. In some embodiments, the precondition may be a defined relationship between the at least one variable field, other variable, groups, sections. Alternatively, the precondition may be time based, location based, date based, task based, user based, ID based, or manually configured based on any other first-user defined criteria.

In operation S907, the dynamic, self-referential checklist generation system 300 receives receiving a seventh user input, from the first user through the GUI, for selecting that the dynamic self-referential checklist will not display the additional variable field unless the precondition is satisfied by the second user when completing the dynamic self-referential checklist.

In operation S908, the dynamic, self-referential checklist generation system 300 generates the dynamic self-referential checklist for presentation to the second user, such that the additional variable field is not visible to the second user unless the precondition is satisfied by the second user when completing the dynamic self-referential checklist In operation S403, a user input to select one or more users and/or groups is received via the displayed GUI. For example, the user may input one or more identifiers or names of other registered users and/or groups in the system. The users and/or groups are registered in the system with predefined roles that are respectively associated with predetermined privileges.

In operation S404, a user input to select one or more privileges to be assigned to the selected users is received via the displayed GUI. For example, a list of assignable privileges may be displayed by selection of a drop down menu on the GUI. The user can then select one or more of the assignable privileges to be assigned to the one or more users selected in operation S403. It is understood that operations S403 and S404 may be performed (or re-performed) in any order according to various embodiments. In some embodiments, the list of assignable privileges is determined by the entity presentation system 300 based on the one or more users selected in operation S403. In some embodiments, wherein the operation S404 is performed before operation S403, the one or more users selectable by the user is determined by the entity presentation system 300 based on the one or more privileges selected by the user in operation S404.

In operation S405, the selected one or more privileges are set for the selected one or more users and/or groups with respect to the particular entity. In this case, the set one or more privileges (i.e., entity-based privileges) may be stored in the security platform 360, in the entity storage 340, or elsewhere in accordance with various embodiments. Further, the entity-based privileges may be stored together with (physically or logically) the corresponding entity, or may be mapped to the corresponding entity. Further, in operation S405, the selected one or more privileges may be set in response to a user input to a particular item or button displayed on the screen (such as a Confirm, Invite, or Share button). Further, upon setting the one or more entity-based privileges, a notification may be sent to the one or more users and/or groups selected in operation S403.

Figure 10:
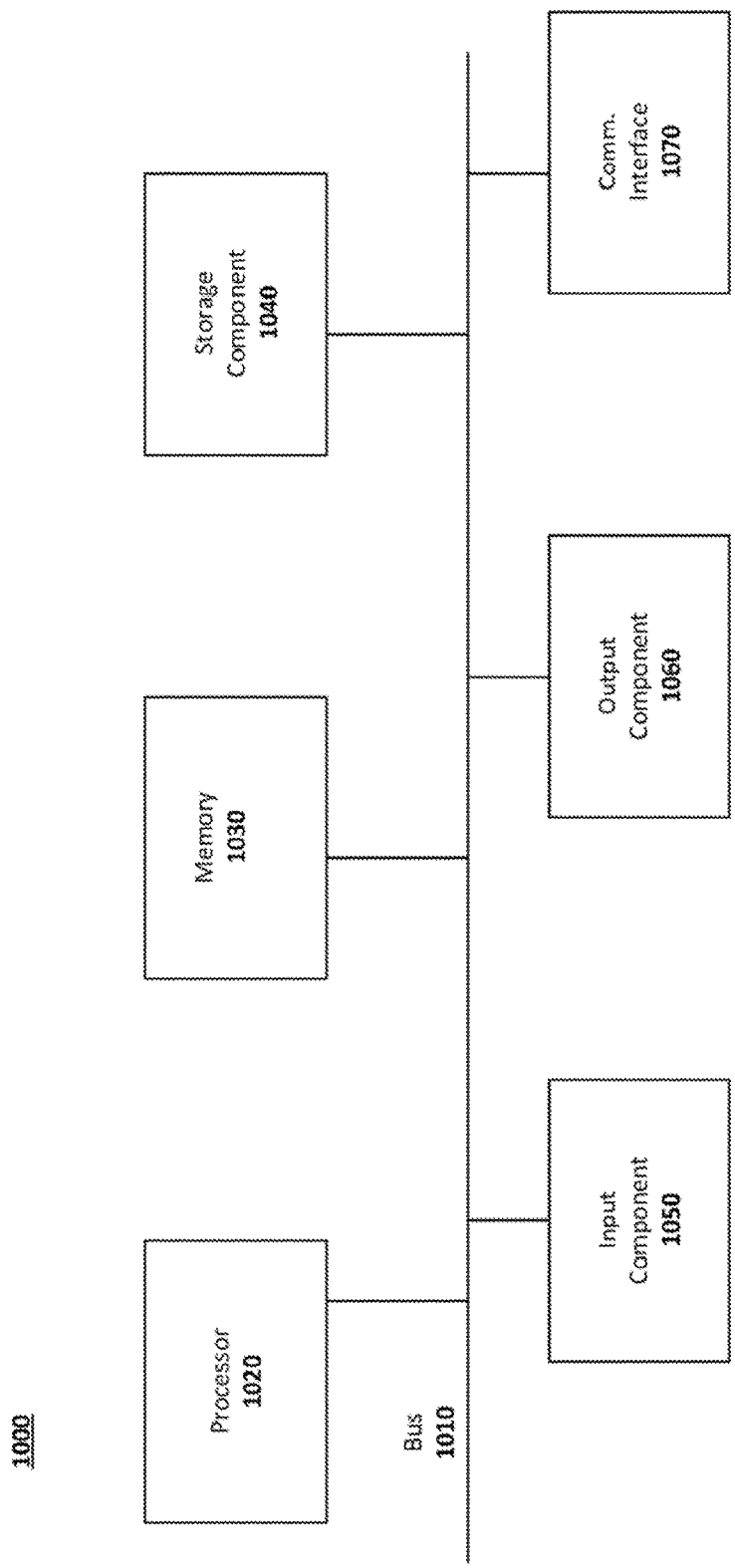
FIG. 10 is a diagram of components of one or more devices according to an embodiment.

FIG. 10 is a diagram of components of one or more devices according to an embodiment. Device 1000 may correspond to a computing device described above (e.g., at least one server or device that implements or embodies the dynamic, self-referential checklist generation system 300, at least one server or device that stores or deploys the application platform 100, at least one server or device that implements or embodies the data platform 200, at least one user terminal 400, etc.).

As shown in FIG. 10, the device 1000 may include a bus 1010, a processor 1020, a memory 1030, a storage component 1040, an input component 1050, an output component 1060, and a communication interface 1070. It is understood that one or more of the components may be omitted and/or one or more additional components may be included.

The bus 1010 includes a component that permits communication among the components of the device 1000. The processor 1020 is implemented in hardware, firmware, or a combination of hardware and software. The processor 1020 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 1020 includes one or more processors capable of being programmed to perform a function.

The memory 1030 includes a random access memory (RAM), a read only memory (ROM), and/or another type of dynamic or static storage device (e.g., a flash memory, a magnetic memory, and/or an optical memory) that stores information and/or instructions for use by the processor 1020.

The storage component 1040 stores information and/or software related to the operation and use of the device 1000. For example, the storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 1050 includes a component that permits the device 1000 to receive information, such as via user input (e.g., a touch screen display, a keyboard, a keypad, a mouse, a button, a switch, and/or a microphone). The input component 1050 may include a sensor for sensing information (e.g., a global positioning system (GPS) component, an accelerometer, a gyroscope, and/or an actuator).

The output component 1060 includes a component that provides output information from the device 1000 (e.g., a display, a speaker, and/or one or more light-emitting diodes (LEDs)).

The communication interface 1070 includes a transceiver-like component (e.g., a transceiver and/or a separate receiver and transmitter) that enables the device 1000 to communicate with other devices, such as via a wired connection, a wireless connection, or a combination of wired and wireless connections. The communication interface 1070 may permit device 1000 to receive information from another device and/or provide information to another device. For example, the communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

The device 1000 may perform one or more processes described herein. The device 1000 may perform operations based on the processor 1020 executing software instructions stored by a non-transitory computer-readable medium, such as the memory 1030 and/or the storage component 1040. A computer-readable medium is defined herein as a non-transitory memory device. A memory device includes memory space within a single physical storage device or memory space spread across multiple physical storage devices.

Software instructions may be read into the memory 1030 and/or the storage component 1040 from another computer-readable medium or from another device via the communication interface 1070. When executed, software instructions stored in the memory 1030 and/or storage component 1040 may cause the processor 1020 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of generating a dynamic self-referential checklist for a user in a checklist presentation system, the method comprising:
    based on a first user input from a first user to generate a dynamic self-referential checklist in the checklist presentation system, controlling to output a graphical user interface (GUI) for generating the dynamic self-referential checklist;
    receiving a second user input, from the first user through the GUI, for creating a section of at least one group including at least one variable field which is to be completed by a second user, the second user being different from the first user;
    receiving a third user input, from the first user through the GUI, for creating the at least one group in the section;
    receiving a fourth user input, from the first user through the GUI, for creating the at least one variable field in the at least one group, in the at least one section;
    receiving a fifth user input, from the first user through the GUI, for creating an additional variable field;
    receiving a sixth user input, from the first user through the GUI, for defining a precondition in relation to a variable field of the at least one variable field, wherein if the precondition has faulty logic in relation to the variable field, an error message is displayed through the GUI;
    receiving a seventh user input, from the first user through the GUI, for selecting that the dynamic self-referential checklist will not display the additional variable field unless the precondition is satisfied by the second user when completing the dynamic self-referential checklist, and
    generating the dynamic self-referential checklist for presentation to the second user, such that the additional variable field is not visible to the second user unless the precondition is satisfied by the second user when completing the dynamic self-referential checklist.

2. The method according to claim 1, wherein upon reception of the fifth user input from the user through the GUI, the additional variable filed is initially configured to be hidden from view by the second user when completing the dynamic self-referential checklist.

3. The method according to claim 1, wherein the fifth user input, from the user through the GUI is for creating the additional variable field within a different group than the at least one group.

4. The method according to claim 1, wherein the fifth user input, from the user through the GUI is for creating the additional variable field within a different section than the at least one section.

5. The method according to claim 1, wherein upon reception of the fourth user input from the user through the GUI, the at least one variable field is initially configured to be mandatory for the second user when completing the dynamic self-referential checklist.

6. The method according to claim 1, wherein the at least one variable field is configured to be completed with information including at least one of image data, audio data, video data, and file data.

7. The method according to claim 1, wherein the fifth user input, from the user through the GUI is for creating the additional variable field within the at least one group.

8. A dynamic self-referential checklist generation system comprising:
 a memory storing instructions; and
 at least one processor configured to execute the instructions to:
  based on a first user input from a first user to generate a dynamic self-referential checklist in the checklist presentation system, control to output a graphical user interface (GUI) for generating the dynamic self-referential checklist;
  receive a second user input, from the first user through the GUI, for creating a section of at least one group including at least one variable field which is to be completed by a second user, the second user being different from the first user;
  receive a third user input, from the first user through the GUI, for creating the at least one group in the section;
  receive a fourth user input, from the first user through the GUI, for creating the at least one variable field in the at least one group, in the at least one section;
  receive a fifth user input, from the first user through the GUI, for creating an additional variable field;
  receive a sixth user input, from the first user through the GUI, for defining a precondition in relation to a variable field of the at least one variable field, wherein if the precondition has faulty logic in relation to the variable field, an error message is displayed through the GUI;
  receive a seventh user input, from the first user through the GUI, for selecting that the dynamic self-referential checklist will not display the additional variable field unless the precondition is satisfied by the second user when completing the dynamic self-referential checklist; and
  generate the dynamic self-referential checklist for presentation to the second user, such that the additional variable field is not visible to the second user unless the precondition is satisfied by the second user when completing the dynamic self-referential checklist.

9. The dynamic self-referential checklist generation system according to claim 8, wherein the at least one processor is further configured to execute the instructions to:
 upon receiving the fifth user input from the user through the GUI, initially set the additional variable filed to be hidden from view by the second user when completing the dynamic self-referential checklist.

10. The dynamic self-referential checklist generation system according to claim 8, wherein the fifth user input, from the user through the GUI is for creating the additional variable field within a different group than the at least one group.

11. The dynamic self-referential checklist generation system according to claim 8, wherein the fifth user input, from the user through the GUI is for creating the additional variable field within a different section than the at least one section.

12. The dynamic self-referential checklist generation system according to claim 8, wherein the at least one processor is further configured to execute the instructions to:
 upon receiving the fourth user input from the user through the GUI, initially set the at least one variable field to be mandatory for the second user when completing the dynamic self-referential checklist.

13. The dynamic self-referential checklist generation system according to claim 8, wherein the at least one variable field is set and configured to be completed with information including at least one of image data, audio data, video data, and file data.

14. The dynamic self-referential checklist generation system according to claim 8, wherein the fifth user input, from the user through the GUI is for creating the additional variable field within the at least one group.

15. A non-transitory computer-readable recording medium having recorded thereon instructions executable by at least one processor to perform a method of generating a dynamic self-referential checklist for a user in a checklist presentation system, the method comprising:
 based on a first user input from a first user to generate a dynamic self-referential checklist in the checklist presentation system, controlling to output a graphical user interface (GUI) for generating the dynamic self-referential checklist;
 receiving a second user input, from the first user through the GUI, for creating a section of at least one group including at least one variable field which is to be completed by a second user, the second user being different from the first user;
 receiving a third user input, from the first user through the GUI, for creating the at least one group in the section;
 receiving a fourth user input, from the first user through the GUI, for creating the at least one variable field in the at least one group, in the at least one section;
 receiving a fifth user input, from the first user through the GUI, for creating an additional variable field;
 receiving a sixth user input, from the first user through the GUI, for defining a precondition in relation to a variable field of the at least one variable field, wherein if the precondition has faulty logic in relation to the variable field, an error message is displayed through the GUI;
 receiving a seventh user input, from the first user through the GUI, for selecting that the dynamic self-referential checklist will not display the additional variable field unless the precondition is satisfied by the second user when completing the dynamic self-referential checklist; and
 generating the dynamic self-referential checklist for presentation to the second user, such that the additional variable field is not visible to the second user unless the precondition is satisfied by the second user when completing the dynamic self-referential checklist.

16. The non-transitory computer-readable recording medium having recorded thereon the instructions executable by the at least one processor to perform the method of generating a dynamic self-referential checklist for a user in a checklist presentation system, according to claim 15, wherein upon reception of the fifth user input from the user through the GUI, the additional variable filed is initially configured to be hidden from view by the second user when completing the dynamic self-referential checklist.

17. The non-transitory computer-readable recording medium having recorded thereon the instructions executable by the at least one processor to perform the method of generating a dynamic self-referential checklist for a user in a checklist presentation system, according to claim 15, wherein the fifth user input, from the user through the GUI is for creating the additional variable field within a different group than the at least one group.

18. The non-transitory computer-readable recording medium having recorded thereon the instructions executable by the at least one processor to perform the method of generating a dynamic self-referential checklist for a user in a checklist presentation system, according to claim 15, wherein the fifth user input, from the user through the GUI is for creating the additional variable field within a different section than the at least one section.

19. The non-transitory computer-readable recording medium having recorded thereon the instructions executable by the at least one processor to perform the method of generating a dynamic self-referential checklist for a user in a checklist presentation system, according to claim 15, wherein upon reception of the fourth user input from the user through the GUI, the at least one variable field is initially configured to be mandatory for the second user when completing the dynamic self-referential checklist.

20. The non-transitory computer-readable recording medium having recorded thereon the instructions executable by the at least one processor to perform the method of generating a dynamic self-referential checklist for a user in a checklist presentation system, according to claim 15, wherein the at least one variable field is configured to be completed with information including at least one of image data, audio data, video data, and file data.

\* \* \* \* \*